United States Patent
Wang

[19]

[11] Patent Number: 6,090,017

[45] Date of Patent: Jul. 18, 2000

[54] ONE-WAY TRAVEL COMPUTATION DETECT DEVICE FOR EXERCISER

[76] Inventor: Leao Wang, No 1, Lane 154, Charng Long Rd., Taiping City, Taichung Hsien, Taiwan

[21] Appl. No.: 09/229,576

[22] Filed: Jan. 13, 1999

[51] Int. Cl.⁷ .................................................. A63B 69/06
[52] U.S. Cl. .................................. 482/72; 482/8; 482/57; 73/379.01; 73/490
[58] Field of Search ................................... 482/3, 4, 6, 7, 482/8, 54, 57, 72, 900; 73/379.01, 379.06, 379.07, 490

[56] References Cited

U.S. PATENT DOCUMENTS

| | | | |
|---|---|---|---|
| 2,993,382 | 6/1961 | Orrange | 73/490 |
| 3,120,760 | 2/1964 | Waldhauer, Jr. | 73/490 |
| 4,378,111 | 3/1983 | Tsuchida et al. | 272/73 |
| 4,998,725 | 3/1991 | Watterson et al. | 272/129 |

*Primary Examiner*—Jerome W. Donnelly
*Assistant Examiner*—Tam Nguyen

[57] ABSTRACT

A one-way travel computation detector device for an exerciser having at least three sensors provided with an operation route of any movable exerciser wherein the sensors are equally spaced from one another. The sensors send feedback signals which are different from one another to facilitate signal identification by a central processor. A permanent magnetic wave transmitter is provided on a mobile part and has a working area capable of covering the entire exercise path. One way travel of the mobile part can be accurately computed upon acquiring of a one-way signal sequence from each of the sensors. The central processor accepts only a predetermined signal sequence.

3 Claims, 2 Drawing Sheets

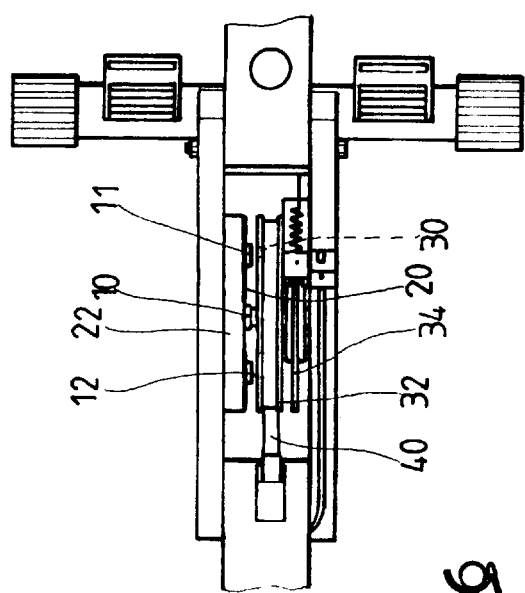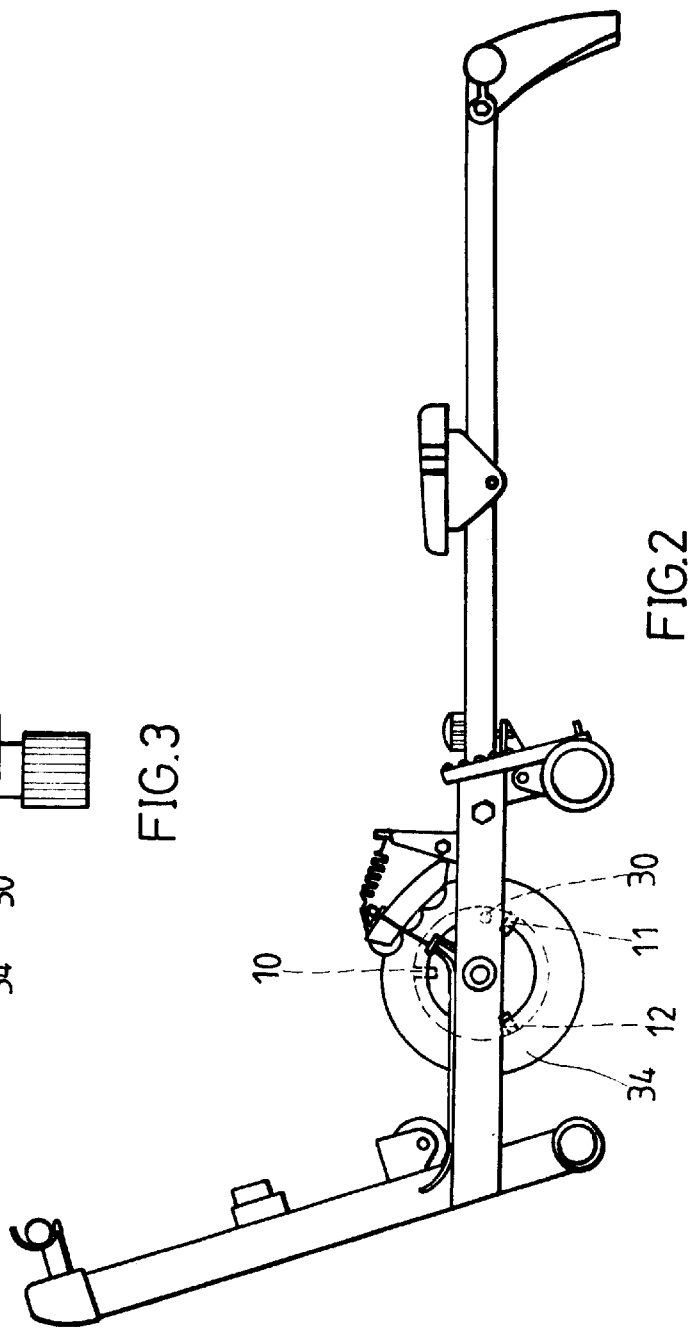

ONE-WAY TRAVEL COMPUTATION DETECT DEVICE FOR EXERCISER

BACKGROUND OF THE INVENTION

1. Field of the Invention The present invention relates to a one-way travel computation detector for an exerciser, and more particularly, to a device capable of making an accurate computation of an exercising trip by a user working out with a certain exerciser.

2. Description of the Prior Art

Although various types of exercisers allowing simple operation, space saving and good workout results have been well accepted by the general public, a professional athlete or a general user is particularly conscious of travel data displayed by an attached electronic meter (including mileage, speed, time and counts) that serve a vital reference, and even more important for the professional athlete, in judging if the training amount is sufficient or overdone.

The prior art usually comprises a sensor at a given point and a permanent transmitter on a mobile part so that once the mobile part is operating, the transmitter sends signals to be picked up by the sensor which in turn sends the signals back to a central processor to register the total travel of motion by the mobile part. However, for certain types of exercisers with a special pattern of motion or structure design, their mobile parts may create positive and inverse motion, thus a wrong total travel motion is registered to mislead the user. With a sculling exerciser, the user has both hands repeatedly drawing out and releasing a rope, i.e., a mobile part, the retraction of the rope is achieved by a spring loaded rotor. That is, the motion travel created by the rope and the rotor constitutes a status of positive and inverse motion, but the force from the user is applied only when the rope is pulled out and there is no force applied when the rope is retracted. Nonetheless, both travels of the positive and inverse motion are registered by the sensing device of the prior art and accounted for the total travel. Accordingly, an electronic meter displays data that fails to reflect the real travel of motion.

SUMMARY OF THE INVENTION

The purpose of the present invention is to provide a device for an exerciser to detect accurate motion travel data by multiple sensors that send different signals to a central processor which is set up only for selected one-way segment parameters.

BRIEF DESCRIPTION OF THE DRAWINGS

FIG. 2 is a side view of the preferred embodiment of the present invention.

FIG. 3 is a partial top view of the preferred embodiment of the present invention.

DETAILED DESCRIPTION OF THE INVENTION

Figure 1:
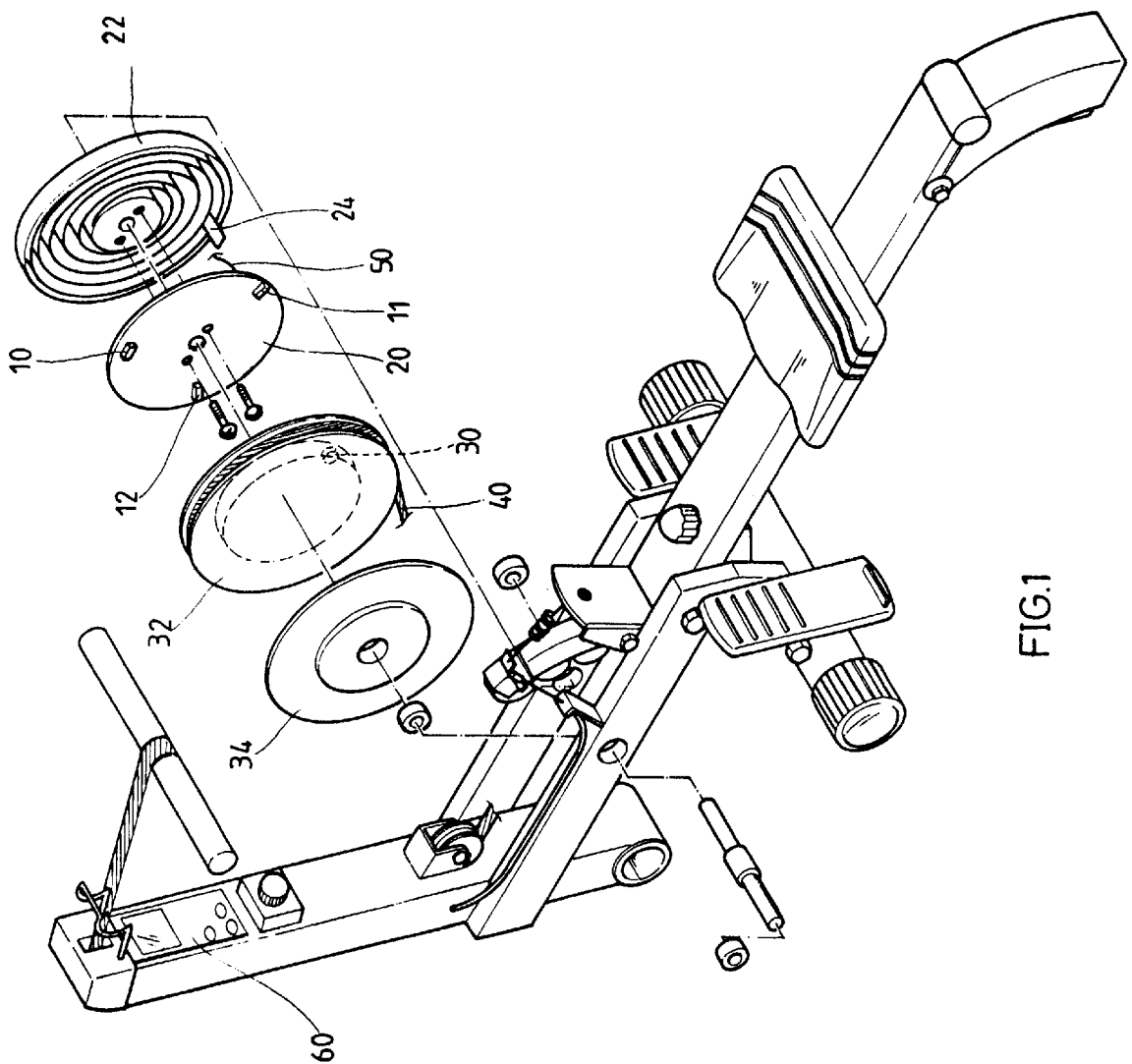
FIG. 1 is an exploded view of a preferred embodiment of the present invention applied to a sculling exerciser.

The present invention comprises a one-way travel computation detector or device for an exerciser, essentially having at least three sensors provided with an operation route of any exerciser with the sensors deployed equally spaced from one another, sending feedback signals which are different from one another to facilitate signal identification by a central processor, and a permanent magnetic wave transmitter provided on a surface of a mobile part having its working area capable of covering the entire exercise path; thereby, one way travel of the mobile part can be accurately computed upon acquiring of one-way segmental parameters from the sensed and registered signals of the transmitter in sequence by each of the sensors in conjunction with the central processor which accepts only the data of one-way segmental parameters whenever the transmitter becomes active within the path of the exercise following the operation by the mobile part.

Referring to FIGS. 1, 2 and 3, a preferred embodiment of the present invention applied to a sculling exerciser, is essentially comprised of three sensors 10, 11, 12 on an end surface of a coil spring load lid 20 and a permanent magnetic wave transmitter 30 on a rotor 32 at a location corresponding to the location of the coil spring load lid 20; a coil spring load disk 22 and the coil spring load lid 20 are fixed at where both will be unaffected by the rotation of the rotor while both of the rotor 32 and a one-way fly wheel 34 rotate when a rope 40 is pulled. The rotor 32 rotates in positive or inverse rotation respectively depending on whether the rope 40 is in retracted or released status due to retraction or release action from a coil spring 24. Both the rotor 32 and the rope 40 are mobile parts.

Signals back fed to a central processor (not illustrated in the figures) via a cable 50 picked up from each of the three sensors 10, 11, 12 are different, and the central processor is preset to read only one-way segment parameters. Therefore, once the transmitter 30 rotates with the rotor 32, parameters within working segment transmitted to the central processor by the three sensors 10, 11, 12 are accounted for the computation only if the rotor rotates in a certain direction. When the central processor is preset to read only the travel and the number of times the rope 40 has been pulled out, the rotor 32 rotates in a positive direction, and given that various signals fed back to the central processor as picked up by those three sensors 10, 11, 12 respectively are Signal A, Signal B and Signal C, they are picked up by the central processor in sequences of A-B-C-A-B-C, and so on. When the rotor 32 rotates in the inverse direction, signals picked up by the central processor are in sequence of C-B-A-C-B-A, and so on. So when the segmental signal parameters picked up by the central processor are AB, BC or CA, such parameters are accepted and registered. On the contrary, segmental signal parameters CB, BA or AC picked up by the central processor are not registered so as to accurately register the travel of motion by the rotor 32 and display it on an electronic meter 60 for reference by the user.

I claim:

1. A one-way travel detector system for an exercising device comprising:
   a) a movable portion on the exercising device that is alternately movable in opposite directions;
   b) a fixed element on the exercising device located adjacent to the movable portion;
   c) at least three sensors mounted on the fixed element equidistantly spaced apart along a path of travel of the movable portion, each sensor generating a signal different from the other sensors;

d) at least one magnetic wave transmitter mounted on the movable part so as to move therewith and to pass adjacent to each sensor during movement of the movable portion thereby causing each of the sensors to generate a signal; and, e) a display device for displaying data based on a pre-determined sequence of signals from the at least three sensors, the pre-determined sequence indicating movement of the movable portion in only one of the opposite directions.

2. The one-way travel detector system of claim 1 wherein the movable portion comprises a rotor rotatable in opposite directions.

3. The one-way travel detector system of claim 1 wherein the fixed element comprises a coil spring load lid.

* * * * *